United States Patent
Wang

(10) Patent No.: US 7,781,913 B2
(45) Date of Patent: Aug. 24, 2010

(54) UPS HAVING SOLAR POWERED BATTERY CHARGER

(75) Inventor: Chia-Hung Wang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 123 days.

(21) Appl. No.: 11/834,020

(22) Filed: Aug. 6, 2007

(65) Prior Publication Data

US 2008/0185915 A1   Aug. 7, 2008

(30) Foreign Application Priority Data

Feb. 6, 2007   (CN) .................. 2007 1 0200155

(51) Int. Cl.
*H02J 9/00* (2006.01)
*H01M 10/44* (2006.01)

(52) U.S. Cl. .................. 307/64; 320/101
(58) Field of Classification Search ............ 307/64; 320/101
See application file for complete search history.

(56) References Cited

U.S. PATENT DOCUMENTS 5,501,083 A * 3/1996 Kim ............... 62/228.4
6,680,547 B1 * 1/2004 Dailey ............ 307/31
7,112,891 B2 * 9/2006 Johnson et al. ... 290/1 A
7,411,308 B2 * 8/2008 Parmley ......... 290/1 R
2005/0206241 A1 * 9/2005 Saxena et al. ... 307/66

FOREIGN PATENT DOCUMENTS

CN       1560958       1/2005

* cited by examiner

Primary Examiner—Michael Rutland Wallis
(74) Attorney, Agent, or Firm—Frank R. Niranjan

(57) ABSTRACT

A UPS includes a first transfer switch, a first battery charger, a second transfer switch, a solar energy absorption board, and a second battery charger. The first transfer switch connects a power source to an electrical device. The first battery charger connects the power source to a storage battery for charging the storage battery. An output of the storage battery is connected to the first transfer switch via an inverter. The first transfer switch controls the storage battery to supply power to the electrical device. The second transfer switch is connected between the first battery charger and the storage battery. The second battery charger connects the solar energy absorption board to the second transfer switch. The second transfer switch controls the power source to charge the storage battery via the first battery charger or the solar energy absorption board to charge the storage battery via the second battery charger.

12 Claims, 3 Drawing Sheets

UPS HAVING SOLAR POWERED BATTERY CHARGER

BACKGROUND

1. Field of the Invention

The present invention relates to uninterrupted power supply (UPS) system, and particularly to a UPS which has solar powered battery charger.

2. Description of Related Art

Referring to FIG. 1, a block diagram of a conventional UPS is shown, together with a power source 100 and an electrical device 700. The UPS includes a filter 200, a transfer switch 300, a battery charger 400, a storage battery 500, and an inverter 600. The power source 100 is connected to one input of the transfer switch 300 and an input of the battery charger 400 via the filter 200. An output of the battery charger 400 is connected to another input of the transfer switch 300 via the storage battery 500 and inverter 600 in turn. An output of the transfer switch 300 is connected to the electrical device 700. The power source 100 charges the storage battery 500 via the battery charger 400. If the power source 100 fails when the electrical device 700 is in use, the transfer switch 300 controls the storage battery 500 to directly supply power to the electrical device 700.

However, the storage battery 500 is useful for only a limited amount of time, and if the power source 100 does not start working again during that time, the electrical device 700 will have no power.

What is desired, therefore, is to provide a UPS which has a back-up, solar powered battery charger to charge the storage battery therein.

SUMMARY

An exemplary UPS includes a first transfer switch, a first battery charger, a second transfer switch, a solar energy absorption board, and a second battery charger. The first transfer switch connects a power source to an electrical device. The first battery charger connects the power source to a storage battery for charging the storage battery. An output of the storage battery is connected to the first transfer switch via an inverter. The first transfer switch controls the storage battery to supply power to the electrical device. The second transfer switch is connected between the first battery charger and the storage battery. The second battery charger connects the solar energy absorption board to the second transfer switch. The second transfer switch controls the power source to charge the storage battery via the first battery charger or the solar energy absorption board to charge the storage battery via the second battery charger.

Other advantages and novel features of the present invention will become more apparent from the following detailed description of two embodiments when taken in conjunction with the accompanying drawings, in which:

DETAILED DESCRIPTION

Figure 1:
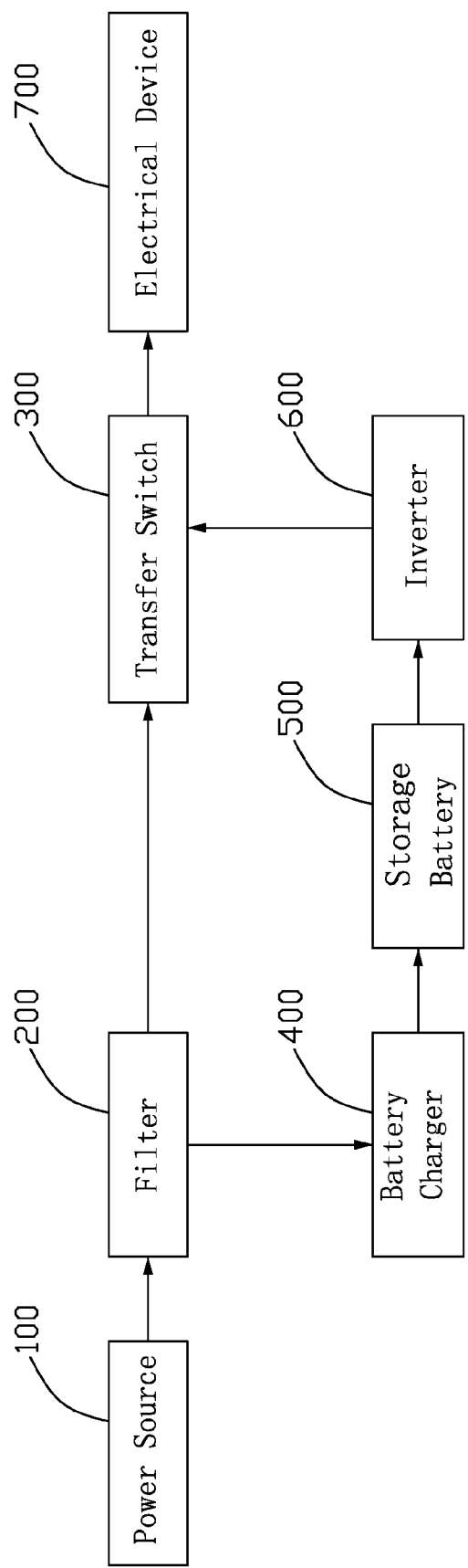
FIG. 1 is a block diagram of a conventional UPS, together with a power source and an electrical device.
Figure 2:
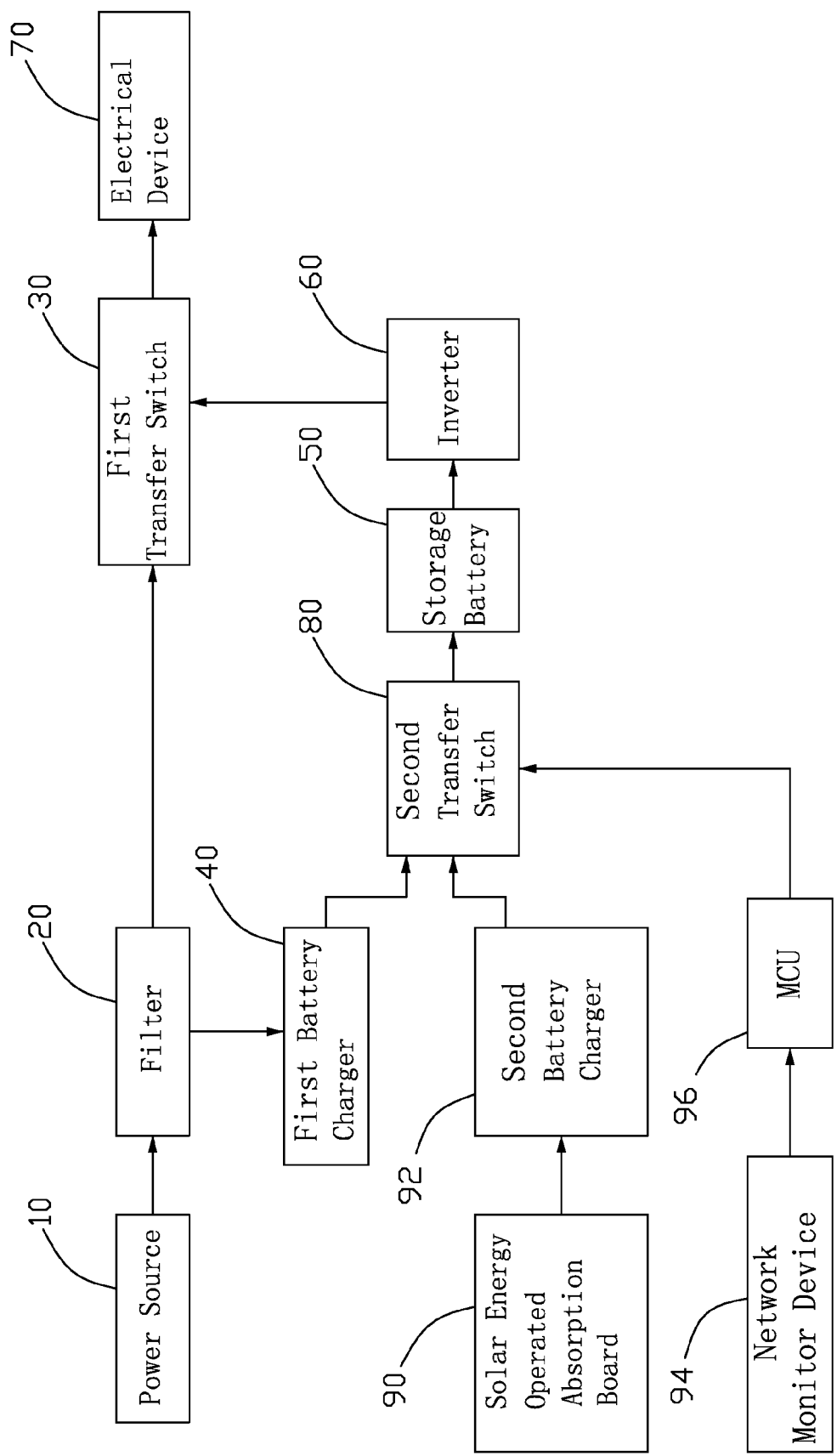
FIG. 2 is a block diagram of a UPS in accordance with a first embodiment of the present invention, together with a power source and an electrical device.

Referring to FIG. 2, an uninterrupted power supply (UPS) in accordance with a first embodiment of the present invention includes a filter 20, a first transfer switch 30, a first battery charger 40, a storage battery 50, an inverter 60, a second transfer switch 80, a solar energy operated absorption board 90, a second battery charger 92, a network monitor device 94 such as a computer, and a micro control unit (MCU) 96.

A power source 10 is connected to one input of the first transfer switch 30 and an input of the first battery charger 40 via the filter 20. An output of the first transfer switch 30 is connected to an electrical device 70. The solar energy operated absorption board 90 is connected to an input of the second battery charger 92. An output of the first battery charger 40 and an output of the second battery charger 92 are connected to inputs of the second transfer switch 80. An output of the second transfer switch 80 is connected to another input of first transfer switch 30 via the storage battery 50 and inverter 60 in turn. The network monitor device 94 is connected to a control terminal of the second transfer switch 80 via the MCU 96.

The power source 10 charges the storage battery 50 via the first battery charger 40. If the power source 10 fails when the electrical device 70 is in use, the first transfer switch 30 controls the storage battery 50 to directly supply power to the electrical device 70. When the storage battery 50 is used to supply power to the electrical device 70, the second transfer switch 80 controls the solar energy operated absorption board 90 to charge the storage battery 50 via the second battery charger 92, thereby the electrical device 70 can continue to function until the power from the power source 10 is restored.

In this embodiment, the second transfer switch 80 can also be controlled by the MCU 96 via the network monitor device 94, and the network monitor device 94 monitors status of the environment where the absorption board 90 locates. Should a light source be present in the environment that can energize the absorption board 90, users can control the second transfer switch 80 to switch from the first battery charger 40 to the second battery charger 92 to charge the storage battery 50, which can save electricity.

Figure 3:
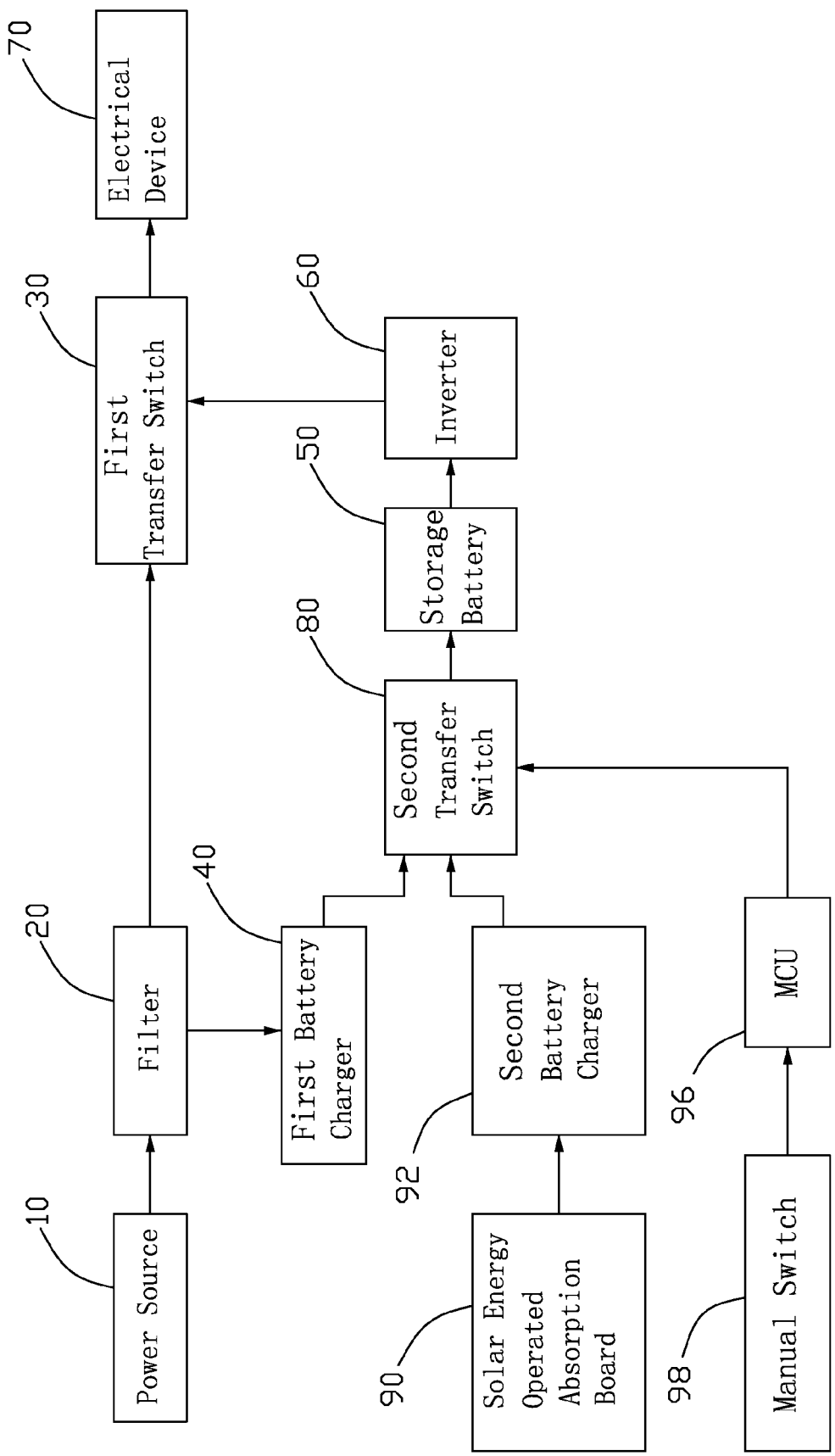
FIG. 3 is a block diagram of a UPS in accordance with a second embodiment of the present invention, together with a power source and an electrical device.

Referring to FIG. 3, an uninterrupted power supply (UPS) in accordance with a second embodiment of the present invention is shown. In the second embodiment, the network monitor device 94 can be replaced by a manual switch 98 as a cost saving measure. The manual switch 98 is connected to a control pin of the MCU 96. The MCU 96 also can control the second transfer switch 80 to switch from the first battery charger 40 to the second battery charger 92 to allow the solar energy operated absorption board 90 to charge the storage battery 50 via the second battery charger 92.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An uninterrupted power supply (UPS) for supplying power to an electrical device, comprising:
   a first transfer switch operably connecting a power source to the electrical device;
   a first battery charger connecting the power source to a storage battery for charging the storage battery when power is available from the power source, an output of the storage battery connected to the first transfer switch via an inverter, the first transfer switch controlling the storage battery to supply power to the electrical device when the power source fails;

a second transfer switch connected between the first battery charger and the storage battery;

a solar energy absorption board; and a second battery charger connecting the solar energy absorption board to the second transfer switch, the second transfer switch controlling the power source to charge the storage battery via the first battery charger or the solar energy absorption board to charge the storage battery via the second battery charger.

2. The UPS as claimed in claim 1, further comprising:

a network monitor device structured and arranged for monitoring status of the environment where the solar energy absorption board locates; and a micro control unit (MCU) connecting the network monitor device to the second transfer switch, the network monitor device controlling the second transfer switch via the MCU, to cause the solar energy absorption board to charge the storage battery via the second battery charger according to the status of the environment.

3. The UPS as claimed in claim 1, further comprising:

a manual switch; and a micro control unit (MCU) connecting the manual switch to the second transfer switch, the manual switch controlling the second transfer switch via the MCU, to control the solar energy absorption board to charge the storage battery via the second battery charger.

4. The UPS as claimed in claim 1, wherein a filter is connected between the power source and the first transfer switch, and also between the power source and the first battery charger.

5. An uninterrupted power supply (UPS) for supplying power to an electrical device comprising:

a power source charge circuit;

a solar energy charge circuit;

a first transfer switch; and a second transfer switch, wherein the power source charge circuit is electrically connected to the electrical device via the first transfer switch and connected to a storage battery via the second transfer switch, the solar energy charge circuit is electrically connected to the storage battery via the second transfer switch, the storage battery is electrically connected to the electrical device via the first transfer switch, wherein the first transfer switch is operable to switch the power source charge circuit and the storage battery to supply power to the electrical device, the second transfer switch is operable to switch the power source charge circuit and the solar energy charge circuit to charge the storage battery.

6. The UPS as claimed in claim 5, wherein the power source charge circuit comprises a power source and a first battery charger, the power source is electrically connected to one input of the first transfer switch and an input of the first battery charger, an output of the first battery charger is electrically connected to an input of the second transfer switch.

7. The UPS as claimed in claim 5, wherein the solar energy charge circuit comprises a solar energy operated absorption board and a second battery charger, the solar energy operated absorption board is electrically connected to another input of the second transfer switch via the second battery charger.

8. The UPS as claimed in claim 5, further comprising:

a network monitor device structured and arranged for monitoring status of the environment where the solar energy absorption board locates; and a micro control unit (MCU), the network monitor device electrically connected to a control terminal of the second transfer switch via the MCU.

9. The UPS as claimed in claim 5, further comprising:

a manual switch; and a micro control unit (MCU), the manual switch electrically connected to a control terminal of the second transfer switch via the MCU.

10. An uninterrupted power supply (UPS) for supplying power to an electrical device, comprising:

a first transfer switch operably connecting a power source to the electrical device;

a storage battery connected to the first transfer switch which controls the storage battery to supply power to the electrical device when the power source fails;

a first battery charger;

a solar energy absorption board connected to the storage battery via the battery charger and a second transfer switch;

a micro control unit (MCU) connected to and configured to control the second transfer switch to allow the solar energy absorption board to charge the storage battery via the battery charger; and a second battery charger connecting the power source with the second transfer switch such that the second transfer switch is capable of selecting one of the power source and the solar energy operated absorption board to charge the storage battery.

11. The UPS as claimed in claim 10, wherein the MCU is controlled by a manual switch.

12. The UPS as claimed in claim 10, wherein the MCU is controlled by a network monitor device structured and arranged for monitoring status of the environment where the solar energy absorption board locates.

* * * * *